United States Patent
Singh et al.

(10) Patent No.: US 12,165,478 B1
(45) Date of Patent: Dec. 10, 2024

(54) INTELLIGENT MAINTENANCE AND REPAIR OF AUTOMATED TELLER MACHINES LEVERAGING EXTENDED REALITY (XR)

(71) Applicant: BANK OF AMERICA CORPORATION, Charlotte, NC (US)

(72) Inventors: Shailendra Singh, Maharashtra (IN); Maneesh Sethia, Telangana (IN); Abhijit Behera, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 18/202,617

(22) Filed: May 26, 2023

(51) Int. Cl.
G07F 19/00 (2006.01)
G06T 19/00 (2011.01)

(52) U.S. Cl.
CPC .......... *G07F 19/209* (2013.01); *G06T 19/006* (2013.01); *G07F 19/206* (2013.01)

(58) Field of Classification Search
CPC ...... G07F 19/209; G07F 19/206; G07F 19/20; G06T 19/006; G07D 11/26
USPC .............................. 235/379, 375; 705/35–45
See application file for complete search history.

(56) References Cited

U.S. PATENT DOCUMENTS

| | | | |
|---|---|---|---|
| 7,163,144 B1 | 1/2007 | Trelawney et al. | |
| 9,846,996 B1* | 12/2017 | Moore | H04L 67/02 |
| 10,957,167 B1 | 3/2021 | Moore | |
| 11,017,321 B1* | 5/2021 | Mishra | G05B 23/0283 |
| 11,354,899 B2 | 6/2022 | Tang et al. | |
| 11,501,502 B2 | 11/2022 | Greco et al. | |
| 11,682,271 B1 | 6/2023 | Moore | |
| 11,783,464 B2 | 10/2023 | Keene | |
| 2003/0084046 A1* | 5/2003 | Rogers | G06F 16/217 707/E17.093 |
| 2006/0180656 A1 | 8/2006 | Ferraro | |
| 2019/0279431 A1* | 9/2019 | Wurmfeld | G07F 19/209 |
| 2021/0279914 A1 | 9/2021 | Shoup et al. | |
| 2021/0373662 A1 | 12/2021 | Pratt et al. | |
| 2022/0130114 A1 | 4/2022 | Handa et al. | |
| 2022/0156745 A1 | 5/2022 | Huang et al. | |
| 2022/0358506 A1 | 11/2022 | Connolly et al. | |
| 2023/0221120 A1 | 7/2023 | Bina et al. | |
| 2023/0237744 A1 | 7/2023 | Lee | |
| 2023/0306380 A1 | 9/2023 | Moore | |

* cited by examiner

*Primary Examiner* — Edwyn Labaze
(74) *Attorney, Agent, or Firm* — Moore & Van Allen PLLC; James C. Edwards

(57) ABSTRACT

Self-orchestration and -management of Automated Teller Machines (ATMs) leveraging the use of extended Reality (XR) amongst support personnel to perform the maintenance/repair. Issues and events required to address the issues are identified at the ATM and a maintenance queue is generated, and subsequently managed, at the ATM that includes an ordered listing of the events and assigned support personnel for each event, along with access credentials for each support personnel. Management of the maintenance queue includes notifying the support personnel of their event assignments of the requisite timing requirements. XR is used to facilitate maintenance and repair in a collaborative and, in some instances simultaneous, manner between remote and onsite support personnel. Various different XR operational modes are implemented to assist support personnel in accomplishing the assigned events without the need for extensive training and/or experience.

19 Claims, 4 Drawing Sheets

INTELLIGENT MAINTENANCE AND REPAIR OF AUTOMATED TELLER MACHINES LEVERAGING EXTENDED REALITY (XR)

FIELD OF THE INVENTION

The present invention is related generally to automated teller machines (ATMs) and, more specifically, systems and methods for indigenous ATM-based orchestration and management of the maintenance/repair of ATMs leveraging the use of extended Reality (XR) as the vehicle by which support personnel maintain or repair the ATM.

BACKGROUND

The repair and maintenance of automated teller machines (ATMs) pose unique problems because while the ATMs are typically controlled and managed by one entity (e.g., financial institutions or the like), the repair and maintenance of the ATMs may require the assistance of other external entities (e.g., third-party vendors or the like). Moreover, due to the complexity and confidentiality issues associated with ATMs, numerous different external entities must be relied on to address maintenance issues and problems arising from different aspects of the ATM (e.g., software, hardware, currency disbursement and the like). In this regard, certain external entities may be authorized to work on specific aspects of an ATM, while being prohibited from accessing other aspects of the ATM (e.g., an external entity authorized to repair/replace hardware may be prohibited from accessing related software). Such specificity in ATM authorizations granted to external entities means that maintenance and/or repairs that involve multiple different external entities (e.g., software and hardware support personnel) may result in inefficiencies in scheduling and orchestration of such activities; especially if only one of the external entities can physically access the ATM at a time for purposes of maintaining device integrity and confidentiality.

Currently, the coordination of ATM maintenance/repair is a highly-involved internal process within the entity in control of the ATM (e.g., financial institution or the like). Specifically, in response to the ATM-controlling entity receiving notification of the need for maintenance or repair, a central team with the ATM-controlling entity is informed of the issue/incident, the issue/incident is cataloged in a database and the central team delegates the issue/incident to an issue-specific team for issue resolution. If the issue requires such, the issue-specific team is responsible for identifying and scheduling external entities for assisting in the maintenance or repair. Such management of the maintenance/repair of ATMs is viewed as a highly inefficient process that imposes unnecessary lag team in the overall ATM maintenance/repair process.

Further, since the current process requires that the ATM notify the ATM-controlling entity of the need for maintenance or repair, the entire maintenance/repair process may be thwarted if network connectivity between the ATM and the financial institution is disrupted (e.g., the communication network is down due to technical issues, natural disasters, or the like).

Moreover, in certain instances (e.g., quarantines, natural disasters or the like) it may be difficult for support personnel (either external entities or internal entities) to be physically present at the ATM to perform requisite maintenance or repair. Similarly, it may be difficult for support personnel to be physically present at the ATM with a reasonable time period so that ATM maintenance repair can be conducted in timely fashion. This may be especially evident, if the ATM maintenance/repair requires a certain level of "technical" expertise and the technical experts available are limited.

Therefore, a need exists to develop systems, methods, computer program products and the like that allow for the orchestration and management of ATM maintenance and repair to occur absent the need of ATM-controlling entity involvement. Thus, the desires approach should lessen/eliminate inefficiencies brough on by manual intervention in the orchestration/scheduling of ATM maintenance and repair. Moreover, desired systems. Methods and the like should allow for ATM-controlling entity support personnel and external support personnel (e.g., third-party vendors or the like) to work simultaneously and/or in a collaborative effort to address ATM issues, so as to lessen/eliminate delays brought on by sequential maintenance/repair processing. Moreover, desired systems, methods and the like should provide for the maintenance and repair to occur with minimal technical skill requirements, so that further delays in maintenance/repair process associated with scheduling technical experts is avoided.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for intelligent self-orchestration and management of Automated Teller Machine (ATM) maintenance (including repair), while leveraging the use of extended Reality (XR) amongst support personnel to perform the maintenance/repair.

In accordance with embodiments of the invention, the ATM receives an internally-generated error message and, in response, implements machine-learning techniques to identify one or more issues requiring ATM maintenance/repair and the events required to address the issues. In response, the ATM generates, and subsequently manages, a maintenance queue to address the one or more issues. The maintenance queue includes (i) a flow/order for the events required to address the one or more issues and (ii) assignment of each event to one or more support personnel. In specific embodiments, generating the queue includes intelligently determining the support personnel based on numerous factors, such as, but not limited to, current availability, proximity of the support personnel to the ATM, support personnel experience with the issue(s) at hand, support personnel technical expertise required of the issues(s) at hand and the like. In further embodiments of the invention, the ATM is configured to implement ATM access privilege rules to identify and assign ATM access privileges to the identified support personnel. Based on the maintenance queue, the ATM generates and initiates communication of notifications to the support personnel that indicate assignment and timing for event(s). Thus, orchestration and management of the maintenance and repair process occurs solely at the ATM, without back-end communication or processing by the ATM-controlling entity (e.g., financial institution or the like). By having the entire orchestration and management of ATM maintenance/repair remain within the ATM, the present invention avoids inefficiencies associated with ATM-controlling entity coordination of the maintenance/repair. In addition, indigenous ATM orchestration and management of maintenance/repair means that maintenance/repair can occur in the event network connectivity to the ATM-controlling entity is unavailable.

Maintenance/repair of the ATM though use of XR means that Virtual and/or Augmented Reality (VR/AR) are implemented to facilitate maintenance and repair of the ATM. In specific embodiments XR is configured to be used in a collaborative manner, whereby remote support personnel interface with the ATM via VR, while onsite support personnel (i.e., located at the ATM) simultaneously interface with the ATM via AR (or a combination of VR and AR). Moreover, the XR maintenance/repair works in conjunction with assigned access privileges, such that, assigned support personnel only receive virtual and/or augmented access to those areas/portions of the ATM to which they are authorized.

In further specific embodiments of the invention, XR maintenance/repair is configured to operate in multiple different modes. A synchronous mode in which the support personnel is provided step-by-step guidance to perform the assigned events/actions related to the maintenance/repair or an asynchronous mode in which the support personnel provide queries and the system responds as a means of determining the steps required to perform the assigned events/actions. In specific embodiments of the invention, the ATM, as part of the orchestration process, determines the mode of operation based on events and/or the assigned support personnel. In other embodiments of the invention, the support personnel can select a mode of operation and/or change modes of operation during performance of assigned events/actions.

The use of XR and the various modes of operation provides for the assignment of support personnel who may have limited experience or technical expertise in performing the maintenance and/or repair. Thus, the present invention limits the need to orchestrate the ATM maintenance/repair such that only highly-experienced and/or technically skilled support personnel are assigned to maintenance/repair events.

A system for intelligent maintenance (including repair) of an Automated Teller Machine (ATM) defines first embodiments of the invention. The system includes an ATM having a first memory and one or more first computing processing devices in communication with the first memory. The first memory stores an ATM maintenance orchestration module that is executable by at least one of the one or more first computing processing devices. The ATM maintenance orchestration module is configured to receive an internally-generated error message that indicates that maintenance is required and/or that one or more faults have occurred. In response to receiving the error message, ATM maintenance orchestration module is configured to implement machine-learning techniques to identify one or more issues associated with the error message and a plurality of events required to address the one or more issues. In response to identifying the issue(s) and the events, ATM maintenance orchestration module is configured to generate and manage a maintenance queue to address the one or more issues. The maintenance queue includes (i) an order for the plurality of events required to address the one or more issues and (ii) assignment of each event in the plurality of events to one or more support personnel. Based on the maintenance queue, ATM maintenance orchestration module is configured to generate and initiate communication of notifications to the one or more support personnel that indicate assignment and timing for at least one of the events to a corresponding support personnel from amongst the one or more support personnel.

The system additionally includes one or more extended Reality (XR) computing platforms, such as a Virtual Reality/Augmented Reality VR/AR headset or the like. Each of the one or more XR computing platforms is in possession of a corresponding support personnel from amongst the one or more support personnel. XR computing platform(s) include a second memory, one or more second computing processing devices in communication with the second memory and a display in communication with at least one of the one or more second computing processing device. The second memory stores an extended reality (XR) ATM maintenance application that is executable by at least one of the one or more second computing processing devices. The XR ATM maintenance application is configured to present on the display at least one chosen from the group consisting of (i) a virtual reality experience and (ii) augmented reality experience. The (i) virtual reality experience and (ii) augmented reality experience are configured to allow a corresponding support personnel to perform corresponding assigned events on or related to the ATM.

In specific embodiments of the system, the ATM maintenance orchestration module is executed without backend network communication to or backend processing by the entity in control of the ATM. Specifically, (i) identification the one or more issues associated with the error message, (ii) generation the maintenance queue to address the one or more issues, and (iii) generation and initiation of communication of notifications to the one or more support personnel occur without backend network communication to and backend processing by an entity in control of the ATM. As a result, since the orchestration of maintenance and/or repair of the ATM is entirely native to the ATM, maintenance and repair occurs without manual intervention within the controlling entity and may proceed even in the event that the ATM loses network connectivity to the controlling entity.

In other specific embodiments of the system, the ATM maintenance orchestration module is further configured to implement ATM access privilege rules to identify ATM access privileges for each of the one or more support personnel based on events assigned to each of the one or more support personnel. In such embodiments of the system, the (i) virtual reality experience and (ii) augmented reality experience that are presented on the display of the XR computing platform are configured to allow the corresponding support personnel to perform corresponding assigned events in accordance with the ATM access privileges granted to the corresponding support personnel. In this regard, for any given support personnel actual as well as virtual access to the ATM is limited to areas/portions of the ATM to which the support personnel has been granted access privileges.

In further specific embodiments of the system, the ATM maintenance orchestration module is configured to receive the internally-generated error message in response to the ATM determining that the error is incapable of being rectified absent involvement by support personnel. In this regard, if the error is self-correcting, maintenance or repair involving support personnel is avoided.

In still further specific embodiments of the system, the ATM maintenance orchestration module is further configured to implement first machine learning techniques to identify one or more issues associated with the error message by correlating software fault codes with one or more hardware faults.

In other specific embodiments of the system, the ATM maintenance orchestration module is further configured to generate the maintenance queue by determining the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel. In this regard, support personnel may be determined assigned dynamically based on their expertise, experience with the issues at hand and their proximity to the ATM thus, ensuring that the issues are addressed in a timely manner.

In additional specific embodiments of the system, the ATM maintenance orchestration module is further configured to implement second machine learning techniques to predict a future point in time when the one or more issues will result in ATM failure. In such embodiments of the system the ATM maintenance orchestration module is further configured to generate the maintenance queue are based on the future point in time.

Moreover, in other specific embodiments of the system, the XR ATM maintenance application is configured to operate collaboratively on at least two of the extended reality computing platforms. Collaborative operation allows for remote support personnel to be presented, on the corresponding display, the virtual reality experience and for onsite support personnel to simultaneously be presented, on the corresponding display, the augmented reality experience and/or virtual reality experience.

In still further specific embodiments of the system, the XR ATM maintenance application is configured to assist support personnel in addressing at least one of the one or more issues by operating in an operational mode selected from the group consisting of (i) a synchronous operational mode in which step-by-step guidance is presented on the display or (ii) an asynchronous operational mode in which the support personnel provides queries and the XR ATM maintenance application responds to the queries. In related embodiments of the system, the ATM maintenance orchestration module may be further configured to generate and manage the maintenance queue, wherein the module determines the operational mode and the maintenance queue includes the operational mode for each of the plurality of events required to address the one or more issues. In other related embodiments of the system, the XR ATM maintenance application is configured to allow the support personnel to (i) select the operational mode and (ii) change between operational modes while addressing at least one of the one or more issues.

A computer-implemented method for intelligent maintenance (including repair) of an automated teller machine (ATM) defines second embodiments of the invention. The method is executed by one or more computing processing device. The method includes receiving, at an ATM, an internally-generated error message and implementing machine learning techniques, at the ATM, to identify one or more issues associated with the error message and a plurality of events required to address the one or more issues. Further, the method includes generating and managing, at the ATM, a maintenance queue to address the one or more issues. The maintenance queue includes (i) an order for the plurality of events required to address the one or more issues and (ii) assignment of each event in the plurality of events to one or more support personnel. Further, the method includes, based on the maintenance queue, generating and initiating communication, at the ATM, of notifications to the one or more support personnel that indicate assignment and timing for at least one of the events to a corresponding support personnel from amongst the one or more support personnel. In addition, the method includes presenting, on a display of an Extended Reality (XR) computing platform, at least one chosen from the group consisting of (i) a virtual reality experience and (ii) augmented reality experience, wherein the (i) virtual reality experience and (ii) augmented reality experience are configured to allow the corresponding support personnel to perform corresponding assigned events on or related to the ATM.

In specific embodiments of the computer-implemented method, (i) identifying the one or more issues associated with the error message, (ii) generating the maintenance queue to address the one or more issues, and (iii) generating and initiating communication of notifications to the one or more support personnel occur without backend network communication and processing from an entity in control of the ATM.

In further specific embodiments the computer-implemented method includes implementing ATM access privilege rules to identify ATM access privileges for each of the one or more support personnel based on events assigned to each of the one or more support personnel. In such embodiments of the computer-implemented method, the (i) virtual reality experience and (ii) augmented reality experience are further configured to allow the corresponding support personnel to perform the corresponding assigned events in accordance with the ATM access privileges granted to the corresponding support personnel.

In other embodiments of the computer-implemented method, generating the maintenance queue further includes determining the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel.

A computer program product including a non-transitory computer-readable medium defines third embodiments of the invention. The computer-readable medium includes sets of codes for causing one or more computing processing devices to receive, at an ATM, an internally-generated error message and implement machine learning techniques, at the ATM, to identify one or more issues associated with the error message and a plurality of events required to address the one or more issues. The sets of codes further cause the computing processing device(s) to generate and manage, at the ATM, a maintenance queue to address the one or more issues. The maintenance queue includes (i) an order for the plurality of events required to address the one or more issues and (ii) assignment of each event in the plurality of events to one or more support personnel. Based on the maintenance queue, the sets of codes further cause the computing processing device(s) to generate and initiate communication, at the ATM, of notifications to the one or more support personnel that indicate assignment and timing for at least one of the events to a corresponding support personnel from amongst the one or more support personnel. Moreover, the sets of codes further cause the computing processing device(s) to present, on a display of an Extended Reality (XR) computing platform, at least one chosen from the group consisting of (i) a virtual reality experience and (ii) augmented reality experience. The (i) virtual reality experience and (ii) augmented reality experience are configured to allow the corresponding support personnel to perform corresponding assigned events from the plurality of events.

In specific embodiments of the computer program product, the set of codes for causing the one or more computing processing devices to (i) identify the one or more issues associated with the error message, (ii) generate the maintenance queue to address the one or more issues, and (iii) generate and initiate communication of notifications to the one or more support personnel occur without backend network communication and processing from an entity in control of the ATM.

In other specific embodiments of the computer program product, the set of codes for causing the one or more computing processing devices to generate the maintenance queue further comprises the set of codes for causing the one or more computing processing devices to determine the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel.

In additional specific embodiments of the computer program product, the set s of codes further causes the one or more computing processing devices to implement ATM access privilege rules to identify ATM access privileges for each of the one or more support personnel based on events assigned to each of the one or more support personnel. In such embodiments of the computer program product, the (i) virtual reality experience and (ii) augmented reality experience are further configured to allow the corresponding support personnel to perform the corresponding assigned events in accordance with the ATM access privileges granted to the corresponding support personnel.

Thus, according to embodiments of the invention, which will be discussed in greater detail below, the present invention provides for automated and intelligent self-orchestration and -management of Automated teller Machine (ATM) requiring maintenance, including repair. The actual maintenance/repair leverages the use of extended Reality (XR) amongst support personnel to perform the maintenance/repair. In this regard, issues and events required to address the issues are identified at the ATM and a maintenance queue is generated, and subsequently managed, at the ATM that includes an ordered listing of the events and assigned support personnel for each event. Management of the maintenance queue includes notifying the support personnel of their event assignments of the requisite timing requirements. XR including VR and AR is used to facilitate maintenance and repair in a collaborative and, in some instances simultaneous, manner between remote and onsite support personnel. Moreover, various different XR operational modes are implemented to assist support personnel in accomplishing the assigned events without the need for extensive training and/or experience.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
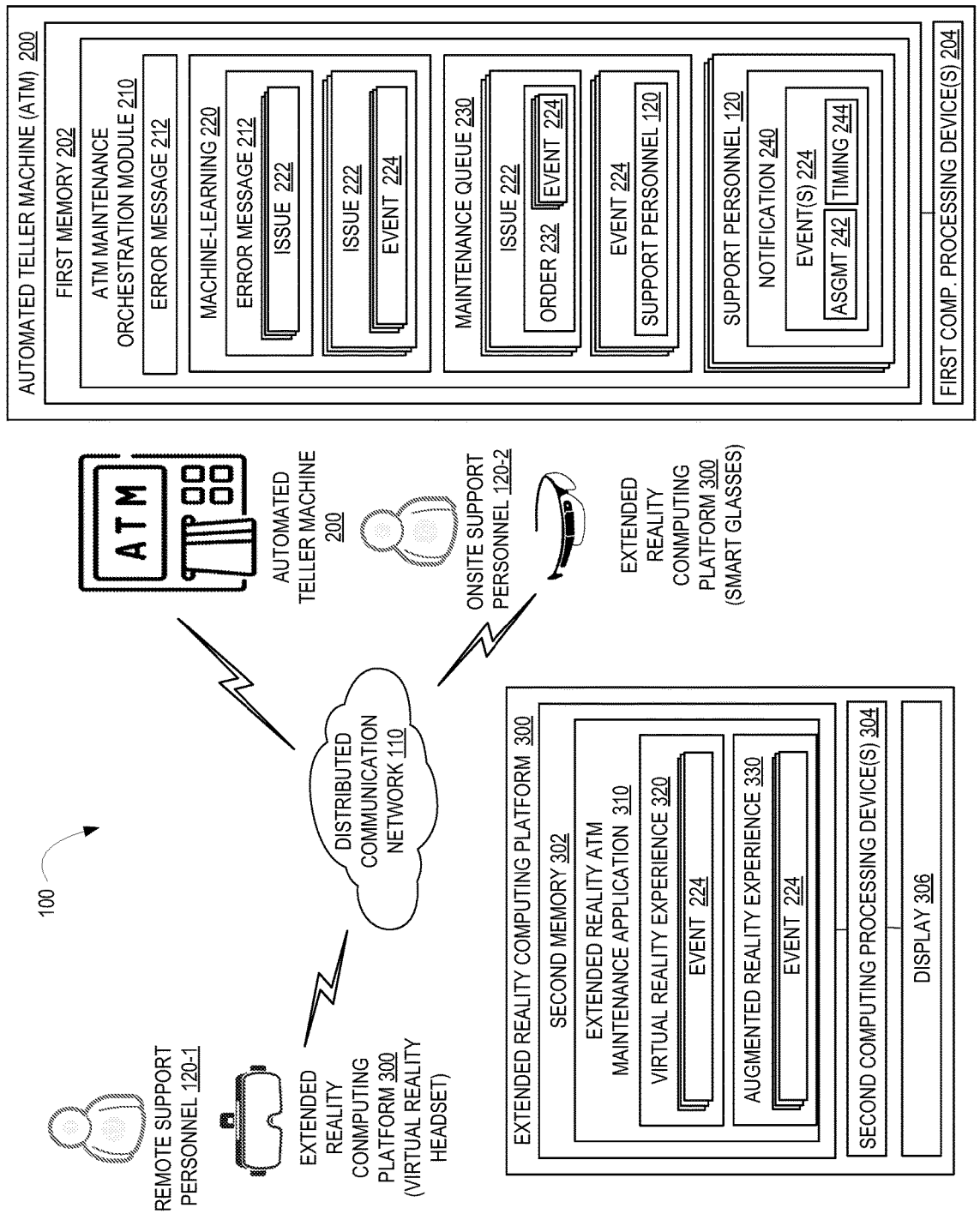
Figure 2:
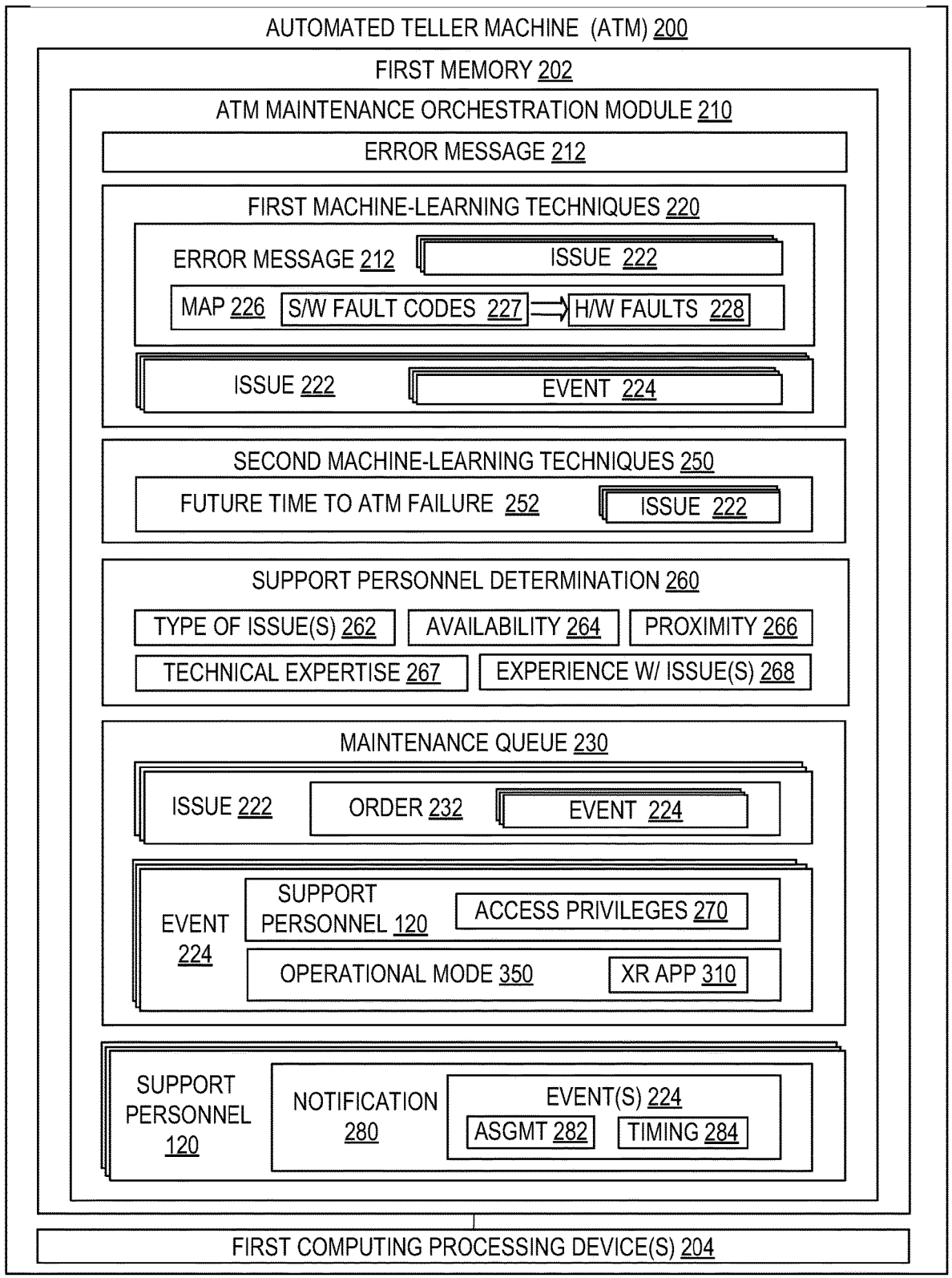
Figure 3:
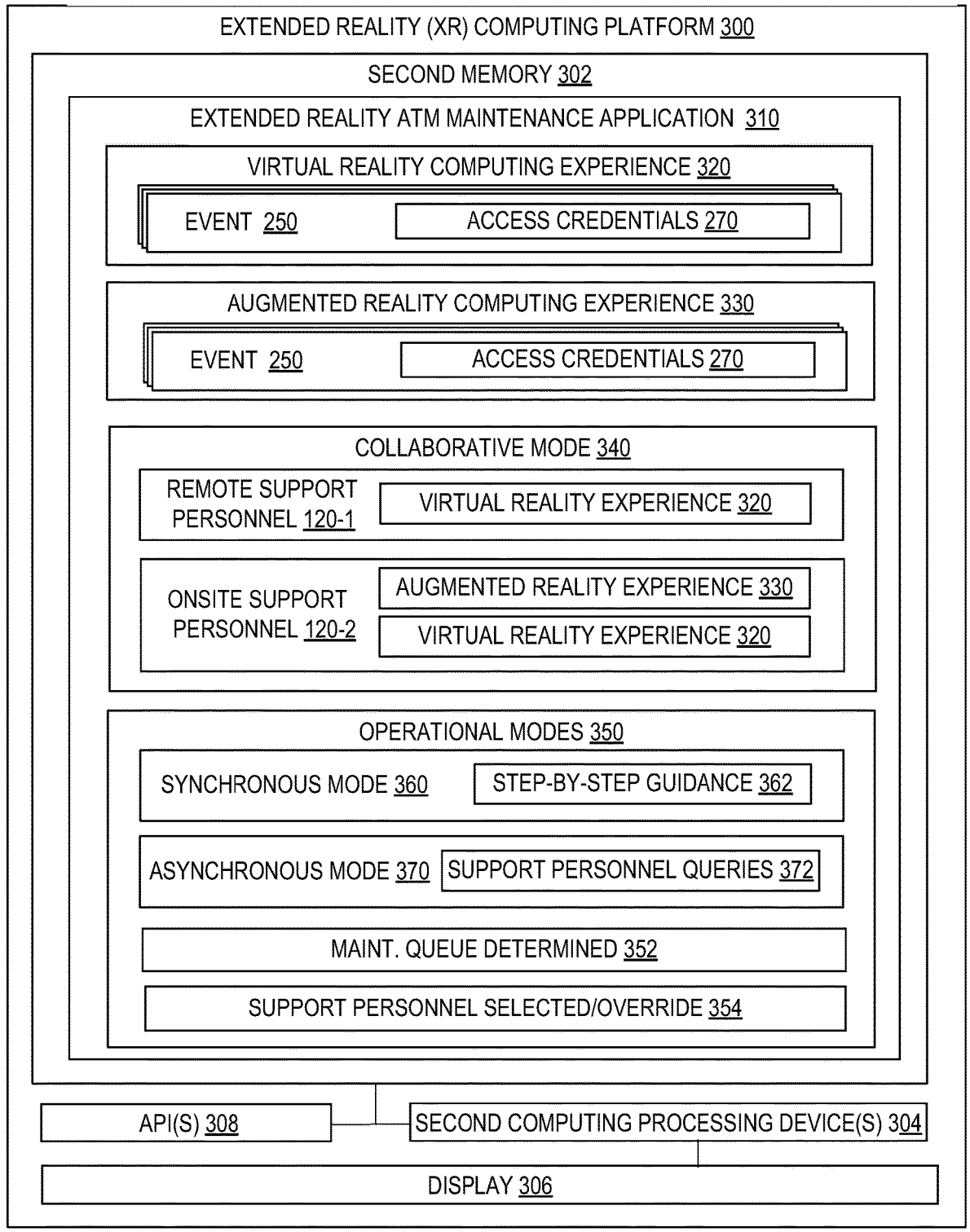
Figure 4:
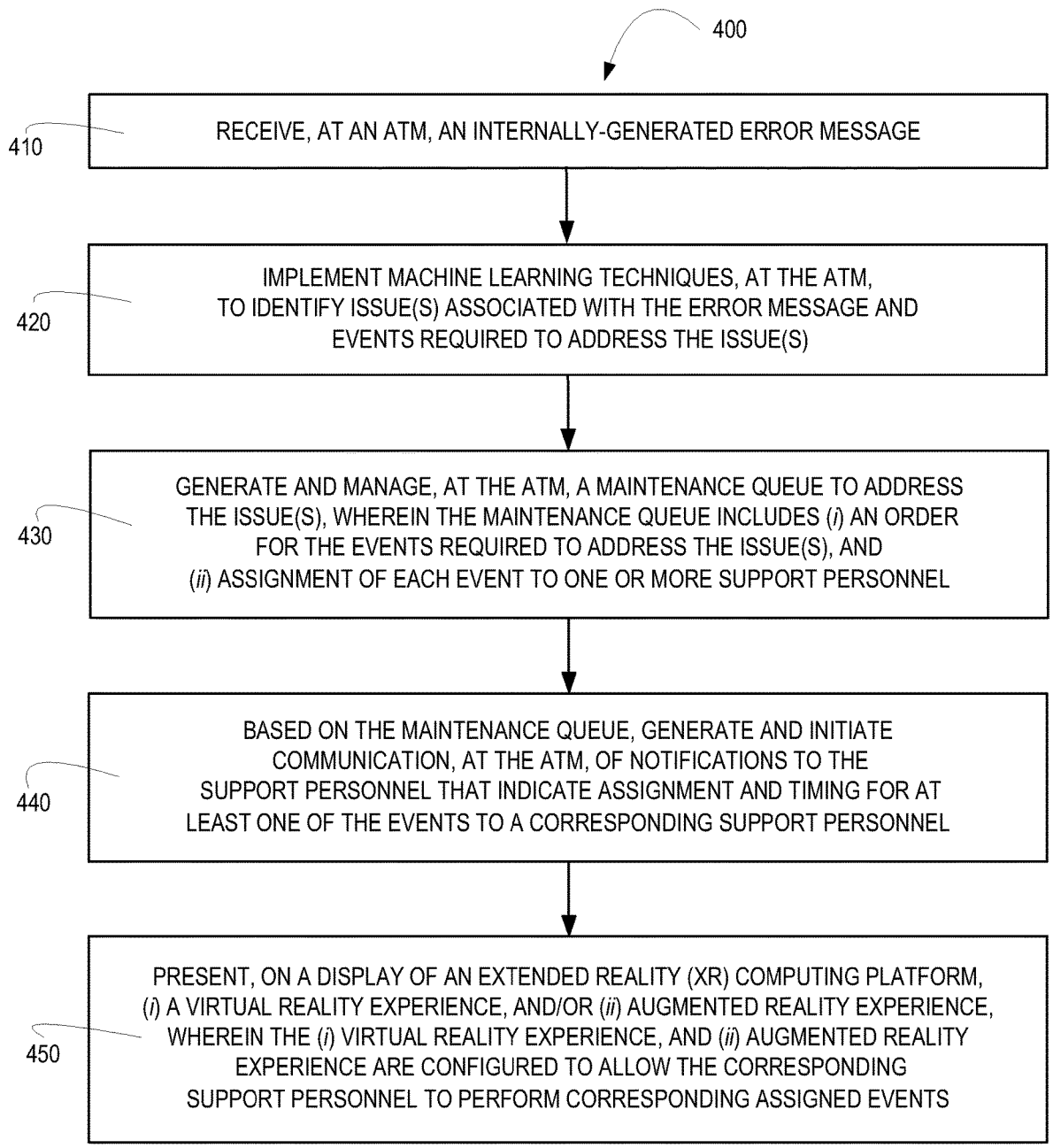

Having thus described embodiments of the disclosure in general terms, reference will now be made to the accompanying drawings, wherein:

FIG. 1 is a schematic/block diagram of a system for intelligent maintenance of an Automated Teller Machine (ATM), in accordance with embodiments of the present invention;

FIG. 2 is a block diagram of an ATM configured for self-orchestration and management of maintenance or repair, in accordance with embodiments of the present invention;

FIG. 3 is a block diagram of an extended Reality (XR) computing platform inkling an XR ATM maintenance application configured to present display of a Virtual Reality (VR) computing experience and/or Augmented Reality Computing experience to allow support personnel to perform actions required to maintain or repair an ATM, in accordance with embodiments of the present invention; and FIG. 4 is a flow diagram of a method for intelligent maintenance of an ATM, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "extended reality" or "XR" includes virtual reality (VR), augmented reality (AR), mixed reality (MR) and any combination thereof.

As used herein, "maintenance" as it refers to Automated Teller Machines (ATMs) includes regularly scheduled and dynamically determined actions/events that are taken to maintain the operation of ATM. In addition, as used herein "maintenance" includes dynamically determined actions/events that are taken to repair (i.e., place back in or ensure an operational state) an ATM that is currently inoperable or is predicted to be inoperable in the near future.

Further, as used herein, "support personnel" includes an individual or group of individuals that assist in the maintenance, including repair, of ATMs. In this regard, support personnel may be individuals or groups of individuals associated with the ATM-controlling entity (e.g., a financial institution or the like) or may be individuals or groups of individuals associated with external entities (e.g., third-party vendors or the like). Moreover, support personnel may be remote support personnel that maintain or repair the ATM from offsite/remote location or onsite support personnel that maintain or repair the ATM while physically located at the ATM.

Thus, according to embodiments of the invention, which will be described in more detail below, systems, methods and computer program products are disclosed that providing for intelligent self-orchestration and management of Automated Teller Machine (ATM) maintenance (including repair), while leveraging the use of extended Reality (XR) amongst support personnel to perform the maintenance/repair.

Self-orchestration and management of ATM maintenance/repair means that all orchestration/management actions occur at the ATM without the need for any network communication with or processing by the backend ATM-controlling entity. Specifically, the ATM receives an internally-generated error message and, in response, implements machine-learning techniques to identify one or more issues requiring ATM maintenance/repair and the events required to address the issues. In response, the ATM generates, and subsequently manages, a maintenance queue to address the one or more issues. The maintenance queue includes (i) a flow/order for the events required to address the one or more issues and (ii) assignment of each event to one or more support personnel. In specific embodiments of the invention, generating the queue includes intelligently determining the support personnel based on numerous factors, such as, but not limited to, current availability, proximity of the support personnel to the ATM, support personnel experience with the issue(s) at hand, support personnel technical expertise required of the issues(s) at hand and the like. In further specific embodiments of the invention, the ATM is configured to implement ATM access privilege rules to identify and assign ATM access privileges to the identified support personnel. Based on the maintenance queue, the ATM generates and initiates communication of notifications to the support personnel that indicate assignment and timing for event(s).

Maintenance/repair of the ATM leveraging XR provides Virtual and/or Augmented Reality (VR/AR) to be implemented to facilitate maintenance and repair of the ATM. In specific embodiments XR is configured to be used in a collaborative manner, whereby remote support personnel interface with the ATM via VR, while onsite support personnel (i.e., located at the ATM) simultaneously interface with the ATM via AR (or a combination of VR and AR). Moreover, the XR maintenance/repair works in conjunction with assigned access privileges, such that, assigned support personnel only receive virtual and/or augmented access to those areas/portions of the ATM to which they are authorized (e.g., software support personnel are granted access to specific software/code but are forbidden from accessing hardware, hardware support personnel are granted access to specific hardware but are forbidden from accessing related software/code and the like).

In further specific embodiments of the invention, XR maintenance/repair is configured to operate in multiple different modes. For example, the XR application may provide for (i) a synchronous mode in which the support personnel is provided step-by-step guidance to perform the assigned events/actions related to the maintenance/repair or (ii) an asynchronous mode in which the support personnel provide queries/prompts and the system responds with answers or directive as a means of determining the steps required to perform the assigned events/actions. In specific embodiments of the invention, the ATM, as part of the orchestration process, determines the mode of operation based on events and/or the assigned support personnel. In other embodiments of the invention, the support personnel can select a mode of operation and/or change modes of operation during performance of assigned events/actions.

The use of XR and the various modes of operation provides for the assignment of support personnel who may have limited experience or technical expertise in performing the maintenance and/or repair. Thus, the present invention limits the need to orchestrate the ATM maintenance/repair such that only highly-experienced and/or technically skilled support personnel are assigned to maintenance/repair events.

Referring to FIG. 1, a schematic/block diagram is presented of a system 100 for intelligent maintenance of an Automated Teller Machine (ATM), in accordance with embodiments of the invention. The system 100 is implemented within a distributed communication network 110, which may include the Internet, one or more intranets, one or more cellular networks or the like. The system 100 includes an ATM 200, which includes first memory 202 and first computing processing device(s) 204 in communication with memory 202. First memory 202 stores ATM maintenance orchestration module 210 that is executable by one or more of first computing processing device(s) 204. ATM maintenance orchestration module 210 is configured to be executed solely on the ATM without any backend communication to or processing by the ATM controlling-entity (e.g., a financial institution or other entity in control of the ATM). In this regard, orchestration of the maintenance required on the ATM can proceed in the event network connectivity to the ATM controlling-entity is inaccessible.

ATM maintenance orchestration module 210 is configured to receive an internally-generated error message 212 (e.g., software fault codes or the like). Error message 212 may indicate a fatal or non-fatal error. Fatal errors cause the ATM to be inoperable, while non-fatal errors indicate that the ATM may be inoperable in the near future. In addition, "error messages" as used herein include messages that indicate the need for scheduled or dynamically-determined maintenance of the ATM. In response to receiving the error message 212, ATM maintenance orchestration module 210 is configured to implement machine learning 220 to identify one or more issues 222 associated with the error message and one or more, typically a plurality, of events 224 required to address/correct the issue(s) 222. In this regard, issues 222 and the related corrective action events 224 are identified through the use of machine learning 220 models built over time and constructed from results of previous resolutions of the same or similar issues.

In response to identifying the issue(s) 222 and events 224 required to address/correct the issue 222, ATM maintenance orchestration module 210 is configured to generate, and subsequently manage, a maintenance queue 230 to address the one or more issues 222. Maintenance queue 230 includes an order 232 (e.g., sequence and, in some instances, timing) for the event(s) 224 and assignment of each event 224 to one or more support personnel 120. In this regard, an issue 224 (or issues) may require the involvement of one support personnel 120 to conduct the requisite event(s) or an issue 224 (or issues) may require the involvement of multiple different support personnel 120 to conduct the requisite event(s). Support personnel 120 may be internal to the ATM-controlling entity (e.g., financial institution associates or the like or may be external to the ATM controlling entity (e.g., third-party vendors or the like). Support personnel include (i) remote support personnel 120-1, which are physically located external to (i.e., remote from) the ATM and (ii) onsite support personnel 120-2, which are physically located at the ATM for purposes of physical engagement with the ATM. Any single issue 222 or event 224 may require remote support personnel 120-1, onsite support personnel 120-2 or both remote and onsite support personnel 120-2.

In response to generating the maintenance queue 230, ATM maintenance orchestration module 210 is configured to generate and initiate communication of notifications 240 to the assigned support personnel 120 that indicate the assignment 242 of event(s) 224 and timing requirements 244 conducting the assigned event(s) 224.

System 100 additionally includes one or more extended Reality (XR) computing platforms 300, each of which are in possession of support personnel 120. As shown in FIG. 1, extended reality computing platform 300 in the form of a virtual reality (VR) headset is in possession of remote support personnel 120-1 and extended reality computing platform 300 in the form of smart glasses is in possession of onsite support personnel 120-2. XR computing platforms 300 include second memory 302, second computing processing device(s) 304 and a display 306 in communication with at least one of the second computing processing device(s) 304. Second memory 302 stores XR ATM maintenance application that is executable by at least one second computing processing device 304 and is configured to present, on display 306, (i) a virtual reality computing experience 320 and/or (ii) an augmented reality computing experience 330. The (i) virtual reality computing experience 320 and/or (ii) augmented reality computing experience 330 are configured to allow the assigned support personnel 120 to perform the assigned events 224. In this regard, XR ATM maintenance application 310 is in communication with ATM maintenance orchestration module 210, such that assigned events 224 within a maintenance queue 230 are communicated to the XR ATM maintenance application 310 of the XR computing platform 300 in possession of the assigned support personnel 120. As a result, support personnel 120 interfacing with the XR ATM maintenance application 310 via their respecting XR computing platform 300 are presented display of assigned events/actions 224 through VR computing experience 320 (e.g., typically remote support personnel 120-1), AR computing experience 330 (e.g., typically onsite support personnel 120-1) or MR computing experience incorporating both VR and AR.

Referring to FIG. 2, a block diagram is presented of ATM 200, in accordance with embodiments of the present invention. In addition to providing greater details of ATM maintenance orchestration module 210, FIG. 2 highlights various alternate embodiments of the invention. ATM 200 includes a computing platform including first memory 202, which may comprise volatile and/or non-volatile memory, such as read-only and/or random-access memory (RAM and ROM), EPROM, EEPROM or any memory common to computing platforms). Moreover, first memory 202 may comprise cloud storage, such as provided by a cloud storage service and/or a cloud connection service.

Further, ATM 200 includes one or more first computing processing devices 204, which may be an application-specific integrated circuit ("ASIC"), or other chipset, logic circuit, or other data processing device. First computing processing device(s) 204 may execute one or more application programming interface (APIs) (not shown in FIG. 2) that interface with any resident programs, such as ATM maintenance orchestration module 210 or the like, stored in first memory 202 and any external programs. First computing processing devices(s) 204 may include various processing subsystems (not shown in FIG. 2) embodied in hardware, firmware, software, and combinations thereof, that enable the functionality of ATM 200 and the operability of ATM 200 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of ATM 200 may include any subsystem used in conjunction with ATM maintenance orchestration module 210 and related tools, routines, sub-routines, algorithms, sub-algorithms, sub-modules thereof.

In specific embodiments of the present invention, ATM 200 additionally includes a communications module (not shown in FIG. 2) embodied in hardware, firmware, software, and combinations thereof, that enables electronic communications between components of ATM 200 and other networks and network devices. Thus, communication module may include the requisite hardware, firmware, software and/or combinations thereof for establishing and maintaining a network communication connection with one or more devices and/or networks.

As previously discussed in relation to FIG. 1, first memory 202 of stores ATM maintenance orchestration module 210, which is configured to receive an internally-generated error message 212 (e.g., software fault codes or the like). In specific embodiments of the system, the error message 212 is received by the module 210 in response to determining that the error associated with the message is incapable of being rectified/corrected absent involvement by support personnel. In this regard, some errors may be self-correcting and, therefore, not require maintenance orchestration. For example, in specific embodiments of the invention, the error may be related to a missing software patch and, in such instances, ATM 200 may be configured to communicate with other networked ATMs to acquire/download the software patch directly from a networked ATM that has already undergone patch update.

In response to receiving the error message 212, ATM maintenance orchestration module 210 implement first machine learning techniques 220 to identify one or more issues 222 associated with the error message and one or more, typically a plurality, of events 224 required to address/correct the issue(s) 222. In this regard, issues 222 and the related corrective action events 224 are identified through the use of machine learning 220 models built over time and constructed from results of previous resolutions of the same or similar issues. In this regard, in specific embodiments of the system, the machine learning models map 226 software fault codes 227 to one or more hardware faults 228, which may result in the need to repair or replace specific hardware or the like.

In alternate embodiments of the invention, in which the error message is associated with a non-fatal error, ATM 300 may implement second machine-learning techniques 250 to predict a future point in time 252 (e.g., date and time) at which the ATM 200 is likely to fail (i.e., become inoperable) due to the issue(s) 222 associated with the error message 212. Knowing when the ATM 200 is likely to fail is instrumental in generating the maintenance queue 230; specifically, determining the order and timing for events 224 including the scheduling of support personnel 120.

In response to identifying the issue(s) 222 and events 224 required to address/correct the issue 222 and, in some embodiments predicting the future point in time 252 at which the ATM 200 is likely to fail, ATM maintenance orchestration module 210 is configured to generate, and subsequently manage, a maintenance queue 230 to address the one or more issues 222. Maintenance queue 230 includes an order 232 (e.g., sequence and, in some instances, timing) for the event(s) 224 and assignment of each event 224 to one or more support personnel 120.

As previously discussed, an issue 224 (or issues) may require the involvement of one support personnel 120 to conduct the requisite event(s) or an issue 224 (or issues) may require the involvement of multiple different support personnel 120 to conduct the requisite event(s). Support personnel 120 may be internal to the ATM-controlling entity (e.g., financial institution associates or the like or may be external to the ATM controlling entity (e.g., third-party vendors or the like). Support personnel include (i) remote support personnel 120-1, which are physically located external to (i.e., remote from) the ATM and (ii) onsite support personnel 120-2, which are physically located at the ATM for purposes of physical engagement with the ATM. Any single issue 222 or event 224 may require remote support personnel 120-1, onsite support personnel 120-2 or both remote and onsite support personnel 120-2.

In specific embodiments of the system 100, generating the maintenance queue includes support personnel determination 260 in which support personnel 260 are determined/assigned to the events 224 based one or more factors. Such factors may include, but are not limited to, type of issue 262, availability 264 of support personnel, proximity 266 of support personnel to the ATM 200, technical expertise 267 of the support personnel as it pertains to the issue(s) 222 or events 224, experience 268 in addressing the issue 222 and/or conducting the events 224 and/or the predicted time to ATM failure 252. In specific embodiments of the system, in which the events 224 are to be conducted as soon as possible to ensure that the ATM 200 remains operative or place the ATM 200 back in an operative state, the availability 264 and proximity 266 of the support personnel are determined in real-time (e.g., support personnel calendars may be accessed and/or GPS functionality used to determine current locations of support personnel and distance in comparison to ATM 200).

In other specific embodiments of the system, in response to determining/assigning support personnel 120, ATM maintenance orchestration module 210 is configured to implement ATM access privilege rules to identify ATM access privileges 270 for each of the one or more assigned support personnel based on events assigned to each of the one or more support personnel. Subsequently, ATM access privileges 270 are included in the maintenance queue 230. As previously discussed, access privileges 270 define what areas/portions of the ATM that the support personnel are authorized to access. Further, when assigned events 224 within a maintenance queue 230 are communicated to the XR ATM maintenance application 310 of the XR computing platform 300 in possession of the assigned support personnel 120, corresponding access privileges 270 are also communicated so that the VR computing experience 320, AR computing experience 330 (e.g., typically onsite support personnel 120-1) or MR computing experience can be tailored to meet the access privileges. For example, the VR presentation may exclude area/portions of the ATM which the support personnel are unauthorized to access or the AR presentation may flag or otherwise make the support personnel aware of area/portions of the ATM that unauthorized for support personnel access.

In still further specific embodiments of the system 100, generating the maintenance queue includes determining an operational mode 350 for the XR ATM maintenance application 310. Further details regarding operational modes 350 are discussed in relation to FIG. 3. The operational mode 350 may be determined based on the issues 222, the events 224, the technical expertise 267 of the assigned support personnel 120, the experience 268 of the assigned support personnel 120, the predicted future time to ATM failure 252 or the like. Subsequently, the operational mode 350 is included in the maintenance queue 230. Further, when assigned events 224 within a maintenance queue 230 are communicated to the XR ATM maintenance application 310 of the XR computing platform 300 in possession of the assigned support personnel 120, corresponding operational mode 350 is also communicated so that the XR ATM maintenance application 310 is configured to present the VR computing experience 320, AR computing experience 330 or MR computing experience in the determined operation mode.

In response to generating the maintenance queue 230, ATM maintenance orchestration module 210 is configured to generate and initiate communication of notifications 240 to the assigned support personnel 120 that indicate the assignment 242 of event(s) 224 and timing requirements 244 conducting the assigned event(s) 224.

In further embodiments of the system, managing the maintenance queue 230 provides for the ATM maintenance orchestration module 210 to notify support personnel when assigned events 224 come due, track the progress and completion of events 224, and change order 232 of the maintenance queue and support personnel assignments when necessary.

Referring to FIG. 3, a block diagram is presented of XR computing platform 300, in accordance with embodiments of the present invention. In addition to providing greater details of XR ATM maintenance application 310, FIG. 3 highlights various alternate embodiments of the invention. XR computing platform 300 may comprise one or multiple devices, such as headsets, smart glasses, mobile communication device, laptops, PCs or the like. XR computing platform 300 includes second memory 302, which may comprise volatile and/or non-volatile memory, such as read-only and/or random-access memory (RAM and ROM), EPROM, EEPROM, flash cards, or any memory common to computing platforms. Moreover, second memory 302 may comprise cloud storage, such as provided by a cloud storage service and/or a cloud connection service.

Further, XR computing platform 300 includes one or more second computing processing devices 304, which may be an application-specific integrated circuit ("ASIC"), or other chipset, logic circuit, or other data processing device. Second computing processing device(s) 304 may execute one or more application programming interface (APIs) 308 that interface with any resident programs, such as XR ATM maintenance application 310 or the like, stored in second memory 302 of XR computing platform 300 and any external programs. Second computing processing devices(s) 304 may include various processing subsystems (not shown in FIG. 3) embodied in hardware, firmware, software, and combinations thereof, that enable the functionality of XR computing platform 300 and the operability of XR computing platform 300 on a distributed communication network 110 (shown in FIG. 1), such as the Internet, intranet(s), cellular network(s) and the like. For example, processing subsystems allow for initiating and maintaining communications and exchanging data with other networked devices. For the disclosed aspects, processing subsystems of XR computing platform 300 may include any subsystem used in conjunction with XR ATM maintenance application 310 and related tools, routines, sub-routines, algorithms, sub-algorithms, sub-modules thereof.

In specific embodiments of the present invention, XR computing platform 300 additionally includes a communications module (not shown in FIG. 3) embodied in hardware, firmware, software, and combinations thereof, that enables electronic communications between components of XR computing platform 300 and other networks and network devices. Thus, communication module may include the requisite hardware, firmware, software and/or combinations thereof for establishing and maintaining a network communication connection with one or more devices and/or networks.

Second memory 302 of XR computing platform 300 stores XR ATM maintenance application 310, which is executable by at least one of the one or more second computing processing devices 304. As previously discussed in relation to FIG. 1, XR ATM maintenance application 310 is configured to present, on display 306, (i) a virtual reality computing experience 320 and/or (ii) an augmented reality computing experience 330. The (i) virtual reality computing experience 320 and/or (ii) augmented reality computing experience 330 are configured to allow the assigned support personnel 120 to perform the assigned events 224. In this regard, XR ATM maintenance application 310 is in communication with ATM maintenance orchestration module 210, such that assigned events 224 within a maintenance queue 230 are communicated to the XR ATM maintenance application 310 of the XR computing platform 300 in possession of the assigned support personnel 120. As a result, support personnel 120 interfacing with the XR ATM maintenance application 310 via their respecting XR computing platform 300 are presented display of assigned events/actions 224 through VR computing experience 320 (e.g., typically remote support personnel 120-1), AR computing experience 330 (e.g., typically onsite support personnel 120-1) or MR computing experience incorporating both VR and AR.

In specific embodiments of the invention, XR ATM maintenance application 310 is configured to operate in a collaborative mode 340 in which two or more support personnel perform events 250 while simultaneously engaging with the XR ATM maintenance application 310. The events may be performed in unison by two or more support personnel or the events may be performed individually either sequentially or in parallel as dictated by the order 262 provided for in the maintenance queue (shown in FIG. 2). In specific embodiments of the invention, collaborative mode 340 may provide for XR ATM maintenance application 310 to present display of a VR computing experience 320 to a remote support personnel 120-1 and simultaneously present display of at least an AR computing experience 330 (and in some embodiments a MR computing experience blending both a VR and AR computing experience 320, 330) to an onsite support personnel 120-2. In the collaborative mode, support personnel are able to use the VR or AR computing experience to "visualize" in real-time events that are being performed on the ATM by another collaborating support personnel 120.

In other specific embodiments of the invention, XR ATM maintenance application 310 is configured for multiple operational modes 350. Specifically, XR ATM maintenance application 310 is configured for a synchronous mode 360 of operation in which support personnel are provided step-by-step guidance 362 for performing assigned events (i.e., conducting maintenance and/or repairing the ATM). For example, in the synchronous mode 360 XR ATM maintenance application 310 is configured to provide display of an AR computing experience 330 that overlays pointers to specific ATM hardware and provides step-by-step directions as to actions to be taken on the hardware. In addition, XR ATM maintenance application 310 is configured for an asynchronous mode 370 of operation in which support personnel provide queries or prompts and the XR ATM maintenance application 310 responds accordingly. For example, in the asynchronous mode 370 support personnel may virtually highlight two different hardware components and the XR ATM maintenance application 310 may respond with details regarding how the two components are related.

As previously discussed in relation to FIG. 2, generation of the maintenance queue 230 by the ATM maintenance orchestration module 210 may include determination 352 and assignment of operational mode 350 for each event 250. For example, if a determination is made that the issue(s) 222 is occurring at the ATM have historically been addressed through performance of events 224, the synchronous mode 360 of operation may be applied. However, if a determination is made that the issue(s) occurring at the ATM have not historically been addressed through performance of events 224 (e.g., the issue is a "new" issue), the asynchronous mode of operation may applied. In other embodiments of the invention, XR ATM maintenance application 310 is configured to allow the support personnel to select 354 the operational mode 350 (or override the mode of operation determined/assigned 352 as part of the maintenance queue 230). Further, in specific embodiments of the invention, XR ATM maintenance application 310 is configured to allow the support personnel to change the operational mode 350 during performance of one or more events. For example, if the support personnel 120 selected the synchronous mode 360 or the maintenance queue applied the synchronous mode 360 and the support personnel encounters difficulty completing the event(s), the support personnel 120 may change to the asynchronous mode 370 in order to gain further insight as to how to complete the event(s) or the like.

Referring to FIG. 4, a flow diagram is presented of a method 800 for intelligent maintenance (including repair) of ATMs, in accordance with embodiments of the present invention. At Event 410, an internally generated error message is received within an ATM. In response to receiving the error message, at Event 420, machine learning techniques are implemented, at the ATM, to identify issue(s) associated with the error message and events required to address the issue(s). In specific embodiments of the invention machine learning techniques are implemented to map software fault codes to hardware faults or the like.

In response to identifying issue(s) and events, at Event 430, a maintenance queue is generated, and subsequently managed, at the ATM, which includes an order for the events and assignment of each event to one or more support personnel. In specific embodiments of the method, generating the maintenance queue includes determining support personnel (both remote and/or onsite) based on type of issue(s), proximity to the AMT, availability (either current or in the future), technical expertise, experience with the issue and the like. In additional specific embodiments of the method, generating the maintenance queue includes implementing access credential rules to determine and assign access credentials to the support personnel which define areas/portions of the ATM that the support personnel are authorized to access. Moreover, in other specific embodiments of the method, generating the maintenance queue includes determining and assigning Extended Reality (XR) maintenance application operational modes (e.g., synchronous or asynchronous as described in relation to FIG. 3) to each event.

In response to generating the maintenance queue, at Event 440, notifications/alerts are generated and communication initiated, at the ATM, to assigned support personnel that notify the support personnel of assigned events and timing requirements for the assigned events.

At Event 450, a Virtual Reality (VR) and/or Augmented Reality (AR) computing experience is presented on a VR/AR computing platform that allows the assigned support personnel to interact with the VR/AR to perform assigned events. In this regard, the maintenance queue is in communication with the application presenting the VR/AR computing experience such that the support personnel are presented display of VR/AR related to their assigned events including assigned access credentials (i.e., only authorized areas/portions of the ATM are presented to the support personnel).

Thus, present embodiments of the invention discussed in detail above, provide for automated and intelligent self-orchestration and -management of Automated teller Machine (ATM) requiring maintenance, including repair. The actual maintenance/repair leverages the use of extended Reality (XR) amongst support personnel to perform the maintenance/repair. In this regard, issues and events required to address the issues are identified at the ATM and a maintenance queue is generated, and subsequently managed, at the ATM that includes an ordered listing of the events and assigned support personnel for each event. Management of the maintenance queue includes notifying the support personnel of their event assignments of the requisite timing requirements. XR including VR and AR is used to facilitate maintenance and repair in a collaborative and, in some instances simultaneous, manner between remote and onsite support personnel. Moreover, various different XR operational modes are implemented to assist support personnel in accomplishing the assigned events without the need for extensive training and/or experience.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent maintenance of an Automated Teller Machine (ATM), the system comprising:
an ATM including a first memory and one or more first computing processing devices in communication with the first memory, wherein the first memory stores an ATM maintenance orchestration module executable by at least one of the one or more first computing processing devices and configured to:
receive an internally-generated error message,
implement first machine learning techniques to identify one or more issues associated with the error message and a plurality of events required to address the one or more issues,
generate and manage a maintenance queue to address the one or more issues, wherein the maintenance queue includes (i) an order for the plurality of events required to address the one or more issues and (ii) assignment of each event in the plurality of events to one or more support personnel, and
based on the maintenance queue, generate and initiate communication of notifications to the one or more support personnel that indicate assignment and timing for at least one of the events to a corresponding support personnel from amongst the one or more support personnel; and two or more extended reality computing platforms, each of the two or more extended reality computing platforms in possession of a corresponding support personnel from amongst the one or more support personnel and including a second memory, one or more second computing processing devices in communication with the second memory and a display in communication with at least one of the one or more second computing processing device, wherein the second memory stores an extended reality (XR) ATM maintenance application executable by at least one of the one or more second computing processing devices and configured to:

present on the display at least one chosen from the group consisting of (i) a virtual reality experience and (ii) augmented reality experience, wherein the (i) virtual reality experience and (ii) augmented reality experience are configured to allow a corresponding support personnel to perform corresponding assigned events, and operate collaboratively on at least two of the two or more extended reality computing platforms, wherein collaborative operation allows for (i) remote support personnel from amongst the one or more support personnel to be presented, on the corresponding display, the virtual reality experience and (ii) onsite support personnel from amongst the one or more support personnel to simultaneously be presented, on the corresponding display, the augmented reality experience and/or the virtual reality experience.

2. The system of claim 1, wherein the ATM maintenance orchestration module is further configured to (i) identify the one or more issues associated with the error message, (ii) generate the maintenance queue to address the one or more issues, and (iii) generate and initiate communication of notifications to the one or more support personnel without backend network communication and processing from an entity in control of the ATM.

3. The system of claim 1, wherein the ATM maintenance orchestration module is further configured to implement ATM access privilege rules to identify ATM access privileges for each of the one or more support personnel based on events assigned to each of the one or more support personnel.

4. The system of claim 1, wherein the (i) virtual reality experience and (ii) augmented reality experience are configured to allow the corresponding support personnel to perform corresponding assigned events in accordance with the ATM access privileges granted to the corresponding support personnel.

5. The system of claim 1, wherein the ATM maintenance orchestration module is configured to receive the internally-generated error message in response to the ATM determining that the error is incapable of being rectified absent involvement by support personnel.

6. The system of claim 1, wherein the ATM maintenance orchestration module is further configured to implement first machine learning techniques to identify one or more issues associated with the error message by correlating software fault codes with one or more hardware faults.

7. The system of claim 1, wherein the ATM maintenance orchestration module is further configured to generate the maintenance queue by determining the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel.

8. The system of claim 1, wherein the ATM maintenance orchestration module is further configured to:

implement second machine learning techniques to predict a future point in time when the one or more issues will result in ATM failure, and wherein the ATM maintenance orchestration module is further configured to generate the maintenance queue based on the future point in time.

9. The system of claim 1, wherein the XR ATM maintenance application is configured to assist support personnel in addressing at least one of the one or more issues by operating in an operational mode selected from the group consisting of (i) a synchronous operational mode in which step-by-step guidance is presented on the display or (ii) an asynchronous operational mode in which the support personnel provides queries and the XR ATM maintenance application responds to the queries.

10. The system of claim 9, wherein the ATM maintenance orchestration module is further configured to generate and manage the maintenance queue, wherein the maintenance queue includes the operational mode for each of the plurality of events required to address the one or more issues.

11. The system of claim 9, wherein the XR ATM maintenance application is configured to allow the support personnel to (i) select the operational mode and (ii) change between operational modes while addressing at least one of the one or more issues.

12. A computer-implemented method for intelligent maintenance of an automated teller machine (ATM), the method executed by one or more computing processing devices and comprising:

receiving, at an ATM, an internally-generated error message;

implementing machine learning techniques, at the ATM, to identify one or more issues associated with the error message and a plurality of events required to address the one or more issues;

generating and managing, at the ATM, a maintenance queue to address the one or more issues, wherein the maintenance queue includes (i) an order for the plurality of events required to address the one or more issues and (ii) assignment of each event in the plurality of events to one or more support personnel;

based on the maintenance queue, generating and initiating communication, at the ATM, of notifications to the one or more support personnel that indicate assignment and timing for at least one of the events to a corresponding support personnel from amongst the one or more support personnel; and presenting simultaneously, on a corresponding display of two or more Extended Reality (XR) computing platforms, a virtual reality experience to one or more remote support personnel from amongst the one or more support personnel and at least one of the virtual reality experience and an augmented reality experience to one or more onsite support personnel from amongst the one or more support personnel, wherein the (i) virtual reality experience and (ii) augmented reality experience are configured to allow the one or more remote support personnel and the one or more onsite support personnel to collaboratively perform corresponding assigned events from the plurality of events.

13. The computer-implemented method of claim 12, (i) identifying the one or more issues associated with the error message, (ii) generating the maintenance queue to address the one or more issues, and (iii) generating and initiating communication of notifications to the one or more support personnel occur without backend network communication and processing from an entity in control of the ATM.

14. The computer-implemented method of claim 12, further comprising:
   implementing ATM access privilege rules to identify ATM access privileges for each of the one or more support personnel based on events assigned to each of the one or more support personnel, and
   wherein the (i) virtual reality experience and (ii) augmented reality experience are further configured to allow the corresponding support personnel to perform the corresponding assigned events in accordance with the ATM access privileges granted to the corresponding support personnel.

15. The computer-implemented method of claim 12, wherein generating the maintenance queue further comprises determining the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel.

16. A computer program product comprising:
   a non-transitory computer-readable medium comprising sets of codes for causing one or more computing processing devices to:
   receive, at an ATM, an internally-generated error message;
   implement machine learning techniques, at the ATM, to identify one or more issues associated with the error message and a plurality of events required to address the one or more issues;
   generate and manage, at the ATM, a maintenance queue to address the one or more issues, wherein the maintenance queue includes (i) an order for the plurality of events required to address the one or more issues and (ii) assignment of each event in the plurality of events to one or more support personnel;
   based on the maintenance queue, generate and initiate communication, at the ATM, of notifications to the one or more support personnel that indicate assignment and timing for at least one of the events to a corresponding support personnel from amongst the one or more support personnel; and
   present, simultaneously, on a corresponding display of two or more Extended Reality (XR) computing platforms, a virtual reality experience to one or more remote support personnel from amongst the one or more support personnel and at least one of the virtual reality experience and an augmented reality experience to one or more onsite support personnel from amongst the one or more support personnel, wherein the (i) virtual reality experience and (ii) augmented reality experience are configured to allow the one or more remote support personnel and the one or more onsite support personnel to collaboratively perform corresponding assigned events from the plurality of events.

17. The computer program product of claim 16, wherein the set of codes for causing the one or more computing processing devices to (i) identify the one or more issues associated with the error message, (ii) generate the maintenance queue to address the one or more issues, and (iii) generate and initiate communication of notifications to the one or more support personnel occur without backend network communication and processing from an entity in control of the ATM.

18. The computer program product of claim 16, wherein the set of codes for causing the one or more computing processing devices to generate the maintenance queue further comprises the set of codes for causing the one or more computing processing devices to determine the one or more support personnel based on at least one chosen from group consisting of (i) type of the one or more issues, (ii) expertise required to address the one or more issues, (iii) experience in previously addressing the one or more issues, and (iv) geo-location of the ATM in comparison to geo-location of support personnel.

19. The computer program product of claim 16, wherein the sets of codes further cause the one or more computing processing devices to implement ATM access privilege rules to identify ATM access privileges for each of the one or more support personnel based on events assigned to each of the one or more support personnel, and
   wherein set of codes for causing the one or more computing processing devices to present, on the display of an Extended Reality (XR) computing platform, at least one chosen from the group consisting of (i) a virtual reality experience and (ii) an augmented reality experience, wherein the (i) virtual reality experience and (ii) augmented reality experience are further configured to allow the corresponding support personnel to perform the corresponding assigned events in accordance with the ATM access privileges granted to the corresponding support personnel.

\* \* \* \* \*